United States Patent
Hirose

(10) Patent No.: US 9,225,038 B2
(45) Date of Patent: Dec. 29, 2015

(54) SOLID BATTERY AND METHOD FOR REGENERATING THE SAME

(75) Inventor: Yutaka Hirose, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 225 days.

(21) Appl. No.: 13/819,577

(22) PCT Filed: Sep. 16, 2010

(86) PCT No.: PCT/JP2010/066031
§ 371 (c)(1),
(2), (4) Date: Feb. 27, 2013

(87) PCT Pub. No.: WO2012/035631
PCT Pub. Date: Mar. 22, 2012

(65) Prior Publication Data
US 2013/0164571 A1    Jun. 27, 2013

(51) Int. Cl.
| | |
|---|---|
| *H01M 10/42* | (2006.01) |
| *H01M 10/052* | (2010.01) |
| *H01M 10/054* | (2010.01) |
| *H01M 10/615* | (2014.01) |
| *H01M 10/6571* | (2014.01) |
| H01M 10/0562 | (2010.01) |
| H01M 10/0585 | (2010.01) |
| H01M 2/14 | (2006.01) |
| H01M 10/0565 | (2010.01) |
| H01M 10/26 | (2006.01) |
| H01M 4/02 | (2006.01) |

(52) U.S. Cl.
CPC ......... *H01M 10/052* (2013.01); *H01M 10/054* (2013.01); *H01M 10/4242* (2013.01); *H01M 10/615* (2015.04); *H01M 10/6571* (2015.04); *H01M 2/14* (2013.01); *H01M 10/0562* (2013.01); *H01M 10/0565* (2013.01); *H01M 10/0585* (2013.01); *H01M 10/26* (2013.01); *H01M 2004/027* (2013.01); *Y02E 60/122* (2013.01); *Y02T 10/7011* (2013.01)

(58) Field of Classification Search
CPC ............ H01M 10/4242; H01M 10/26; H01M 10/052; H01M 2/14; H01M 10/054; H01M 2004/027; H01M 10/5083; H01M 10/5006; H01M 10/0565; H01M 10/0562; H01M 10/0585; H01M 10/615; H01M 10/6571; Y02E 60/122; Y02T 10/7011
USPC ..................................................... 429/49, 120
See application file for complete search history.

(56) References Cited

U.S. PATENT DOCUMENTS

| | | | | |
|---|---|---|---|---|
| 2005/0130043 | A1* | 6/2005 | Gao et al. | 429/231.95 |
| 2009/0087723 | A1* | 4/2009 | Inda | 429/62 |
| 2009/0214941 | A1* | 8/2009 | Buck et al. | 429/120 |

FOREIGN PATENT DOCUMENTS

| | | |
|---|---|---|
| JP | A-2002-504741 | 2/2002 |
| JP | A-2010-49968 | 3/2010 |
| WO | WO 99/43034 A1 | 8/1999 |

*Primary Examiner* — Jonathan Jelsma
*Assistant Examiner* — Omar Kekia
(74) *Attorney, Agent, or Firm* — Oliff PLC

(57) ABSTRACT

Provided are a solid battery which can reduce overvoltage and a regeneration method thereof. The solid battery comprises: an anode capable of absorbing and releasing an alkali metal ion or alkaline earth metal ion; a solid electrolyte layer containing a solid electrolyte having ion conductivity and disposed in a manner to contact the anode; a cathode capable of releasing and absorbing the alkali metal ion or alkaline earth metal ion which moves between the anode and cathode; a heating device to heat the anode to a temperature at which it softens; and a fastening device capable of applying force to closely contact the solid electrolyte layer with the anode. The regeneration method comprises the steps of heating the anode to a temperature at which it softens, and compressing the softened anode, in a direction intersecting a face of the anode which contacts with the solid electrolyte layer.

2 Claims, 3 Drawing Sheets

SOLID BATTERY AND METHOD FOR REGENERATING THE SAME

TECHNICAL FIELD

The present invention relates to a solid battery having a solid electrolyte layer, and a method for regenerating the same.

BACKGROUND ART

A lithium-ion secondary battery has a characteristic that it has a higher energy density than other secondary batteries and is operable at a high voltage. Therefore, it is used for information devices such as cellular phones, as being a secondary battery which can be easily reduced in size and weight; and nowadays there are increasing demands for the lithium-ion secondary battery to be used as a power source for large-scale apparatuses such as electric vehicles and hybrid vehicles.

The lithium-ion secondary battery comprises a cathode layer and an anode layer (a pair of electrode layers), and an electrolyte disposed between these. The electrolyte is constituted for example by a non-aqueous liquid or a solid. When the liquid is employed as the electrolyte (hereinafter the liquid being referred to as an "electrolytic solution"), it easily permeates into the cathode layer and the anode layer. Therefore, it is possible to easily form an interface between the electrolyte and an active material contained in the cathode layer and the anode layer, and to easily improve the performance of the battery. However, since widely-used electrolytic solutions are flammable, it is necessary to mount a system to ensure safety. By contrast, electrolytes in solid form (hereinafter referred to as "solid electrolytes") are nonflammable, thus enabling simplification of the above system. As such, a lithium-ion secondary battery provided with a layer containing the nonflammable solid electrolyte (hereinafter the battery being referred to as a "solid battery") has been proposed.

As a technique related to such a solid battery, Patent Document 1 for example discloses a batter comprising: a positive electrode containing a source of mobile alkali metal ions on charge; an alkali metal negative electrode; and a polymer electrolyte. In addition, Patent Document 2 discloses a solid electrolyte secondary battery comprising: a battery cell having a cathode containing a cathode active material capable of absorbing and releasing lithium, an anode containing an alloy-type anode active material, and a solid electrolyte containing a polymer or a separator containing the solid electrolyte; and a control means to control the battery cell at the time of discharge to have a temperature equal to or greater than a temperature that enables the polymer to be deformed.

CITATION LIST

Patent Literatures

Patent Document 1: Japanese Patent Application Laid-Open (JP-A) No. 2002-504741
Patent Document 2: JP-A No. 2010-49968

SUMMARY OF THE INVENTION

Problems to be Solved by the Invention

If metal containing an alkali metal such as lithium or an alkaline earth metal such as calcium is used in an anode of a solid battery, dendrites will be generated in the anode upon charge reaction. Repeatedly charging and discharging the solid battery having dendrites in the anode easily causes the dendrites to grow and recesses and projections (unevenness) to be formed on a face of the anode which contacts with the electrolyte layer. If the recesses and projections are formed on the face of the anode in this way, the lithium ion conductivity resistance in an interface between the anode and the electrolyte layer (hereinafter referred to as "interface resistance") increases and the overvoltage increases, thus easily leading to degradation of the battery performance. The techniques disclosed in Patent Document 1 and Patent Document 2 use metal that is seen to likely cause generation of dendrites; and thus have a drawback of causing the anode to deform and the performance of the battery to easily degrade. In the technique disclosed in Patent Document 2, the polymer is restored to its original shape by being heated and deformed, so it may seem possible to inhibit increase in the interface resistance between the anode and the electrolyte. However, the technique disclosed in Patent Document 2 does not include an approach to restoring the deformed anode back into its original shape. Therefore, with the technique disclosed in Patent Document 2, the effect of inhibiting the increase in the interface resistance between the anode and the solid electrolyte to reduce the overvoltage is likely to be insufficient.

It is therefore an object of the present invention to provide a solid battery which can reduce overvoltage and a method for regenerating the solid battery.

Means for Solving the Problems

In order to solve the above problems, the present invention takes the following means.

In specific, a first aspect of the present invention is a method for regenerating a solid battery comprising an anode capable of absorbing and releasing an alkali metal ion or an alkaline earth metal ion, a solid electrolyte layer containing a solid electrolyte having ion conductivity and disposed in a manner to contact with the anode, and a cathode capable of releasing and absorbing the alkali metal ion or the alkaline earth metal ion which moves between the anode and the cathode, the method comprising the steps of heating the anode to a temperature at which the anode softens, and compressing the softened anode, in a direction intersecting a face of the anode which contacts with the solid electrolyte layer.

In the present invention, the "alkali metal ion" refers to an ion formed from an alkali metal element, such as a lithium ion, a sodium ion, and potassium ion. Additionally in the present invention, the "alkaline earth metal ion" refers to an ion formed from an alkaline earth metal element, such as a calcium ion and a magnesium ion. Further in the present invention, the expression "having ion conductivity" means having a characteristic of conducting an ion (alkali metal ion or alkaline earth metal ion) that moves between the anode and the cathode. Furthermore in the present invention, the "temperature at which the anode softens" refers to a temperature at which the anode softens with at least a part of the anode maintaining its solid state. More specifically, it refers to a temperature equal to or greater than a temperature at which the anode begins to soften and less than a temperature at which the anode becomes completely liquid.

In the first aspect of the present invention, the anode is preferably capable of absorbing and releasing a lithium ion and a heating temperature of the anode is preferably 160° C. or more and less than 185° C.

A second aspect of the present invention is a solid battery comprising: an anode capable of absorbing and releasing an alkali metal ion or an alkaline earth metal ion; a solid electrolyte layer containing a solid electrolyte having ion conductivity and disposed in a manner to contact with the anode; a cathode capable of releasing and absorbing the alkali metal ion or the alkaline earth metal ion which moves between the anode and the cathode; a heating device to heat the anode to a temperature at which the anode softens; and a fastening device capable of applying force to bring the solid electrolyte layer and the anode into close contact with each other.

In the second aspect of the present invention, the anode is preferably capable of absorbing and releasing lithium ions, and a heating temperature of the anode is preferably 160° C. or more and less than 185° C.

Effects of the Invention

The solid battery comprising the anode capable of absorbing and releasing the alkali metal ion or the alkaline earth metal ion has dendrites generated in the anode at a time of battery charge; and repeatedly charging and discharging the battery causes the dendrites to grow. The anode having dendrite growth is deformed; and the solid battery having the deformed anode has an increased interface resistance and an increased overvoltage. In this regard, the first aspect of the present invention comprises the steps of heating the anode capable of absorbing and releasing the alkali metal ion or the alkaline earth metal ion to soften it, and compressing the softening anode in a direction to bring it into close contact with the solid electrolyte layer. Therefore, the anode deformed due to the dendrite growth or the like can be softened to be closely contacted with the solid electrolyte layer; and thereby the face of the anode to contact with the solid electrolyte layer can be smoothed. By smoothing the face of the anode to contact with the solid electrolyte layer, it is possible to increase the contact area of the anode and the solid electrolyte layer, and as a result it is possible to reduce the interface resistance to reduce the overvoltage. As such, according to the present invention, it is possible to provide a method for regenerating a solid battery by which the overvoltage can be reduced.

Further, in the first aspect of the present invention, the anode is capable of absorbing and releasing lithium ions, and the heating temperature is 160° C. or more and less than 185° C.; thereby it is possible to provide a method for regenerating a solid battery which enables reduction of the overvoltage of a solid battery having a high energy density.

The solid battery according to the second aspect of the present invention comprises: the heating device to heat the anode capable of absorbing and releasing the alkali metal ion or the alkaline earth metal ion to the temperature at which the anode softens; and the fastening device capable of applying force to bring the solid electrolyte layer and the anode into close contact with each other. Therefore, the anode deformed due to the dendrite growth or the like can be softened to be closely contacted with the solid electrolyte layer; and thereby the face of the anode to contact with the solid electrolyte layer can be smoothed. By smoothing the face of the anode to contact with the solid electrolyte layer, it is possible to increase the contact area of the anode and the solid electrolyte layer, and as a result it is possible to reduce the interface resistance to reduce the overvoltage. As such, according to the present invention, it is possible to provide a solid battery which can reduce the overvoltage.

Further, in the second aspect of the present invention, the anode is capable of absorbing and releasing lithium ions and the heating temperature is 160° C. or more and less than 185° C.; thereby it is possible to provide a solid battery which has a high energy density and can easily reduce the overvoltage.

Figure 1:
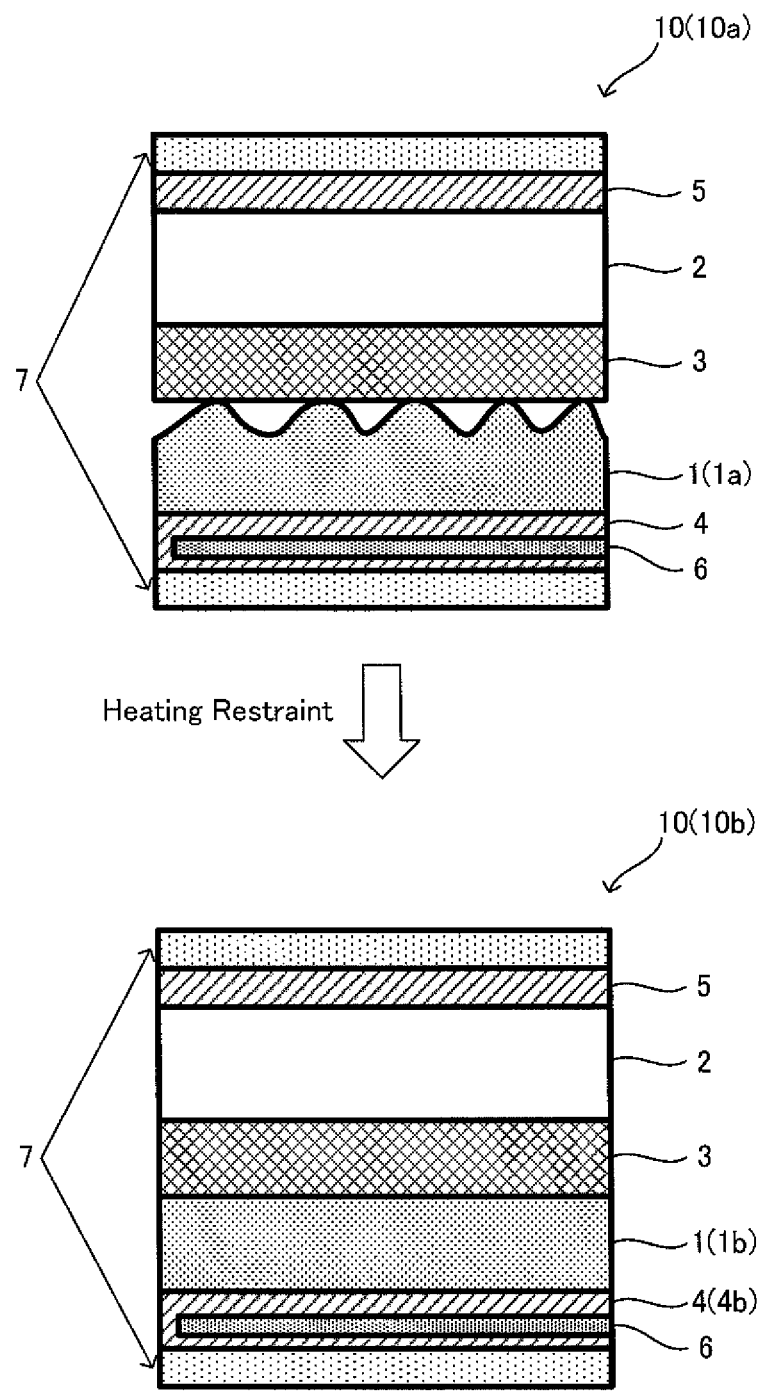
FIG. 1 is a view illustrating the method for regenerating a solid battery of the present invention.

DESCRIPTION OF THE REFERENCE NUMERALS 1, 1a, 1b anode
2 cathode
3 solid electrolyte layer
4, 4b anode current collector
5 cathode current collector
6 heating device
7 fastening device
10, 10a, 10b solid battery

MODES FOR CARRYING OUT THE INVENTION

Hereinafter, the present invention will be described with reference to the drawings. It should be noted, however, that an embodiment shown below is an example of the present invention and that the present invention is not limited to the embodiment shown below.

FIG. 1 is a view illustrating a method for regenerating a solid battery of the present invention (hereinafter sometimes referred to as a "method of the present invention"). FIG. 1 shows a solid battery 10 (a solid battery 10a) before implementation of the method of the present invention and shows the solid battery 10 (a solid battery 10b) after implementation of the method of the present invention. In the below description referring to FIG. 1, the solid battery of the present invention is referred to as a "solid battery 10". Further in the below description, when referring specifically to the solid battery 10 before implementation of the method of the present invention (solid battery 10 after charge reaction), it is sometimes referred to as a "solid battery 10a" for example with the letter "a" added at the end; and when referring specifically to the solid battery 10 after implementation of the method of the present invention, it is sometimes referred to as a "solid battery 10b" for example with the letter "b" added at the end.

As shown in FIG. 1, the solid battery 10 comprises: an anode 1; a cathode 2; a solid electrolyte layer 3 sandwiched by the anode 1 and the cathode 2; an anode current collector 4 connected to the anode 1; a cathode current collector 5 connected to the cathode 2; a heating device 6 embedded in the anode current collector 4; and a fastening device 7 capable of applying force in a direction to bring the anode 1 and the solid electrolyte layer 3 into close contact with each other (in a direction to compress the solid battery 10 from its upper end side and from its lower end side of FIG. 1). The solid battery 10 is used in a manner that the constituents thereof shown in FIG. 1 are accommodated in an exterior material not shown in the figure. The anode 1 contains an anode active material capable of absorbing and releasing lithium ions; and the cathode 2 contains a cathode active material capable of absorbing and releasing lithium ions. The fastening device 7 is in contact with the anode current collector 4 and the cathode current collector 5. When using (when charging and discharging) the solid battery 10, the lithium ions move between the anode 1 and the cathode 2 via the solid electrolyte layer 3.

In charging the solid battery 10, lithium unevenly deposits in the anode 1 and dendrites are generated. Continuing using (charging, or charging and discharging) the solid battery 10 having the dendrites generated in the anode 1 causes the dendrites in the anode 1 to grow, resulting in the anode 1a. As shown in FIG. 1, in the solid battery 10a having the anode 1a, the face of the anode 1a which faces the solid electrolyte layer 3 is partially in contact with the solid electrolyte layer 3. Therefore, compared with a case in which the entire face of the anode 1 facing the solid electrolyte layer 3 is in contact with the solid electrolyte layer 3, the solid battery 10a is likely to easily have an increased lithium ion conductivity resistance in the interface (interface resistance) between the anode 1a and the solid electrolyte layer 3 and to also have an increased overvoltage. Since the performance of the solid battery 10a having the increased interface resistance and the increased overvoltage easily degrades, it is effective to reduce the interface resistance in order to improve the performance of the solid battery 10a.

Figure 2:
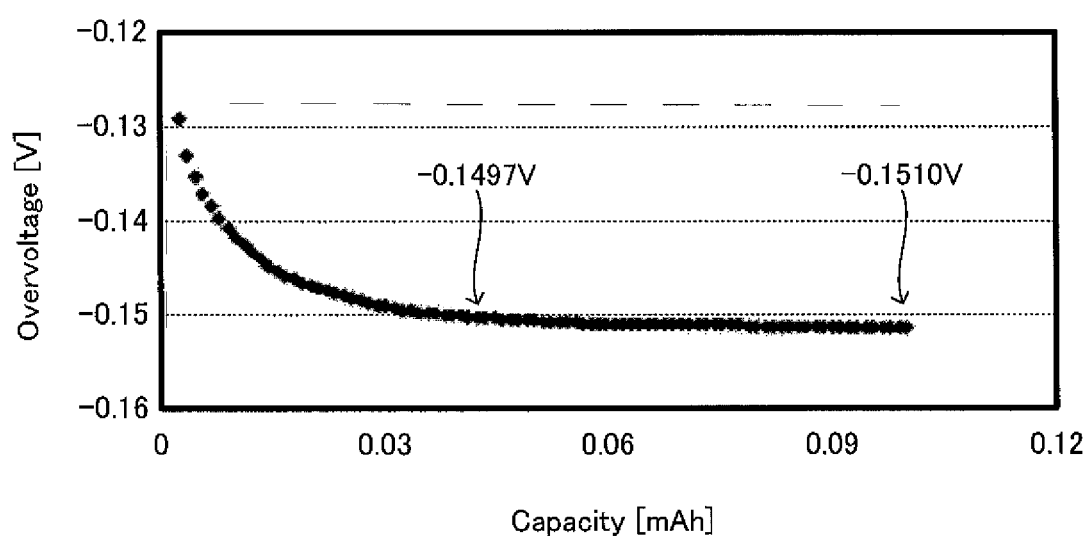
FIG. 2 shows a charging curve of a solid battery.

FIG. 2 shows a charging curve of a solid battery in which lithium ions move between an anode and a cathode. The vertical axis of FIG. 2 represents an overvoltage [V] of the solid battery; and the horizontal axis of FIG. 2 represents a capacity [mAh] of the solid battery. As shown in FIG. 2, when the charge reaction is continued, the overvoltage gradually increases; and according to the result shown in FIG. 2, the change in the overvoltage due to the increase in the capacity has become small around the overvoltage of −0.15 V (hereinafter, the region in which the change in the overvoltage due to the capacity increase is small (the region around the overvoltage of −0.15 V in FIG. 2) is referred to as a "plateau region"). It is seen that in this plateau region, lithium ions are absorbed and stored in an anode active material and dendrites are generated in the anode. As shown in FIG. 2, in the plateau region, the overvoltage has changed from −0.1497 V to −0.1510 V, resulting in increase in the overvoltage by 0.0013 V. This overvoltage increase by 0.013 V can be seen to be due to increase in the interface resistance caused by growth of the dendrites generated in the anode.

If dendrites grow in the anode 1 and recesses and protrusions (unevenness) are formed on the face of the anode 1 which faces the solid electrolyte layer 3, the lithium ion conductivity resistance in the interface (interface resistance) between the anode 1 and the solid electrolyte layer 3 increases and the overvoltage increases. Therefore, the method of the present invention is carried out in order to reduce the interface resistance to reduce the overvoltage. In the method of the present invention shown in FIG. 1, the anode current collector 4 is heated by the heating device 6 to thereby heat the anode 1a in contact with this anode current collector 4 and soften the anode 1a. For example, the temperature at which lithium starts to soften is 160° C.; the melting point of lithium is 180.54° C.; and the temperature at which solid lithium becomes completely liquid is 185° C. for example. Accordingly, if the anode 1a is a lithium foil, the anode 1a may be softened by being heated by the heating device 6 so that it has a temperature of 160° C. or more and less than 185° C., more specifically so that it has a temperature of 160° C. for example.

In the method of the present invention, the fastening device 7 is further used to apply, to the softening anode 1a, force in a direction to bring the anode 1a and the solid electrolyte layer 3 into close contact with each other (force in a direction intersecting the face of the anode 1a which is in contact with the solid electrolyte layer 3), to thereby compress the anode 1a. Compressing the softening anode 1a enables close contact of the anode 1a and the solid electrolyte layer 3, and as a result enables regeneration into the solid battery 10b having the anode 1b whose face confronting the solid electrolyte layer 3 is smoothed. As shown in FIG. 1, in the solid battery 10b after implementation of the method of the present invention, the entire face of the anode 1b which faces the solid electrolyte layer 3 is in contact with the solid electrolyte layer 3. Therefore, compared with the solid battery 10a, the lithium ion conductivity resistance in the interface (interface resistance) between the anode 1b and the solid electrolyte layer 3 can be reduced and the overvoltage can be reduced. Further, smoothing the face of the anode 1 which faces the solid electrolyte layer 3 enables prevention of a circumstance in which the solid electrolyte layer 3 is caused to break by the anode 1a having, due to the dendrite growth and the like, large recesses and protrusions (unevenness) on its face that confronts the solid electrolyte layer 3. In addition, applying the force in the direction described above to the anode 1a by using the fastening device 7 also enables improvement of the close contact of the anode 1a and the anode current collector 4. Accordingly, compared with the solid battery 10a, it is also possible to reduce the electron conductivity resistance in the interface between the anode 1b and the anode current collector 4b, and as a result it is possible to reduce the overvoltage. Therefore, according to the present invention, it is possible to provide a method for regenerating a solid battery by which the overvoltage can be reduced. Moreover, with the configuration of comprising the heating device 6 and the fastening device 7, the present invention can provide the solid battery 10 which can reduce the overvoltage.

Descriptions of the specific configuration of the present invention will be continued below.

The anode 1 contains an anode active material capable of absorbing and releasing lithium ions. A known anode active material that can be used in an anode of a lithium ion secondary battery can be adequately employed as such an anode active material, examples of the known anode active material including: Li; Zn; Al; Ag; an alloy of Li and other metal (e.g. Zn, Al, Ag etc.); and a carbon material such as graphite. In addition to the anode active material, the anode 1 may contain a solid electrolyte, a conductive material, and a binder to bind these. In the case of including the solid electrolyte in the anode 1, a known solid electrolyte usable in a solid battery can be adequately employed to be contained in the anode 1. Examples of such a solid electrolyte include a sulfide solid electrolyte made by mixing $Li_2S$ and $P_2S_5$ such that the ratio thereof is $Li_2S:P_2S_5=50:50$ to 100:0 at a mass ratio (for example a sulfide solid electrolyte made by mixing $Li_2S$ and $P_2S_5$ such that the ratio thereof is $Li_2S:P_2S_5=70:30$ at a mass ratio). Further, in the case of including the conductive material in the anode 1, a known conductive material usable in a solid battery can be adequately employed to be contained. Examples of such a conductive material include carbon materials a typical example of which is carbon black. Further, in the case of including the binder in the anode 1, a known binder usable in a solid battery can be adequately employed to be contained. Examples of such a binder include polymer materials such as a synthetic rubber of fluorine-based rubber etc., and polyvinylidene fluoride.

The cathode 2 contains a cathode active material capable of absorbing and releasing lithium ions. A known cathode active material usable in a solid battery can be adequately employed as the cathode active material to be contained in the cathode 2. Examples of such a cathode active material include lithium cobalt oxide. In addition to the cathode active material, the cathode 2 may contain a solid electrolyte, a conductive material, and a binder to bind these. In the case of including the solid electrolyte, the conductive material, and the binder in the cathode 2, the same ones as those that can be contained in the anode 1 may be used.

The solid electrolyte layer 3 contains a solid electrolyte having lithium ion conductivity and not having electron conductivity. A known solid electrolyte usable in a solid battery can be adequately employed in the solid electrolyte layer 3. Examples of the solid electrolyte to be used in the solid electrolyte layer 3 include a sulfide solid electrolyte made by mixing $Li_2S$ and $P_2S_5$ such that the ratio thereof is $Li_2S$:$P_2S_5$=50:50 to 100:0 at a mass ratio (for example a sulfide solid electrolyte made by mixing $Li_2S$ and $P_2S_5$ such that the ratio thereof is $Li_2S$:$P_2S_5$=70:30 at a mass ratio).

For the anode current collector 4, a known material that can be used in an anode current collector of a solid battery may be adequately employed. A copper foil, a nickel foil, and the like may be used as the anode current collector 4.

For the cathode current collector 5, a known material that can be used in a cathode current collector of a solid battery may be adequately employed. An aluminum foil, a nickel foil, and the like may be used as the cathode current collector 5.

The configuration of the heating device 6 is not particularly limited as long as the heating device 6 can heat the anode 1a to at least a temperature at which the anode 1a begins to soften and as long as it can endure an environment under which the solid battery 10 is used; and a known heating device may be adequately employed. For example, a known heat generating device which generates heat by an electric current flow may be used as the heating device 6. Further, in the present invention, the time to heat the anode 1a by using the heating device 6 (the heating time) may be set to be a time needed to maintain the anode 1a in its softened state during the time from initiation of applying the force using the fastening device 7 to completion of applying the force. The heating time may be for example 0.1 seconds or more and 180 seconds or less. Additionally, in the case of using the known heat generating device which generates heat by the electric current flow, the electric current to cause the heating device 6 to generate heat may be set to be for example 30 A or more and 500 A or less.

The configuration of the fastening device 7 is not particularly limited as long as the fastening device 7 is capable of applying, to the anode 1a, a compressive force that can smooth the face of the anode 1 facing the solid electrolyte layer 3 and as long as it can endure an environment under which the solid battery 10 is used. As the fastening device 7, a known fastening device may be adequately employed which is capable of applying a compressive force (fastening force) to each of the constituents accommodated in an exterior material, for the purpose of reducing the interface resistance in the interface between the solid electrolyte layer and the anode, and so on. The size of the force (pressure) to be applied to the anode 1a is not particularly limited as long as it can smooth the face of the anode 1 which faces the solid electrolyte layer 3. It may be for example 0.0001 MPa or more and 100 MPa or less. In addition, the time to apply the force to the anode 1a is adequately modified in accordance with the size and the like of the force to be applied to the anode 1a. The time to apply the force to the anode 1a is not particularly limited as long as it can smooth the face of the anode 1 which faces the solid electrolyte layer 3. It may be for example 0.1 seconds or more and 300 seconds or less.

In the present invention, it is good if the compressive force to be applied to the anode 1a can fulfill the function to smooth the face of the anode 1a which faces the solid electrolyte layer 3; but it does not need to be applied only for the purpose of smoothing the face of the anode 1a which faces the solid electrolyte layer 3. The fastening device 7 may have, for example, a function to continue applying force in a direction to bring the anode 1, the solid electrolyte layer 3, and the cathode 2 into close contact with one another, irrespective of the degree of the unevenness on the face of the anode 1 which faces the solid electrolyte layer 3. In this case, the present invention can have a configuration of smoothing the face of the anode 1 which faces the solid electrolyte layer 3, by compressing the anode 1a heated by the heating device 6, with the force that has been applied to the anode 1a before the heating of the anode 1a. It is seen that even when the solid battery 10 is operated under the application of the force by the fastening device 7 in the direction to bring the anode 1 and the solid electrolyte layer 3 into close contact with each other, if there are an increased interface resistance and an increased overvoltage, the force applied by the fastening device 7 is smaller than the force needed to smooth the face of the anode 1. Therefore in such a case, the following may be done: controlling the operation of the fastening device 7 using a control device not shown in the figure so as to increase the force applied by the fastening device 7, and then applying the force to the anode 1a heated, thereby regenerating the anode 1a to the anode 1b (the solid battery 10b having the anode 1b) having the smoothed face which faces the solid electrolyte layer 3.

In the above descriptions of the present invention, the following configuration has been introduced: compressing the anode 1a softened at the heating temperature of 160° C. to thereby smooth the face of the anode 1 which faces the solid electrolyte layer 3; and thereby reducing the overvoltage of the solid battery 10. However, the present invention is not limited to this configuration. The present invention may have a configuration to reduce the overvoltage through the process of heating the anode 1a to a temperature at which a part of the anode 1a melts. In the solid battery 10a, the anode 1a, and the solid electrolyte layer 3 and anode current collector 4 sandwiching the anode 1a are accommodated into an exterior material not shown in the figure; and a place in the exterior material to dispose the anode 1a is defined by the solid electrolyte layer 3, the anode current collector 4, and the exterior material. Therefore, even if apart of the anode in is melted, solidifying the anode 1 by decreasing the temperature after completion of the heating while applying the force using the fastening device 7 makes it possible to contact the solidified anode 1b with the solid electrolyte layer 3 and the anode current collector 4, and possible to operate the solid battery 10b. Therefore, the present invention may have a configuration of reducing the overvoltage through the process of heating the anode 1a to the temperature at which a part of the anode 1a melts. Further, in a case of adopting the configuration of smoothing the face of the anode which faces the solid electrolyte layer by applying the force to the softened anode, the temperature at which to heat the anode to soften it may be adequately modified in accordance with the composition of the anode active material contained. However, when the anode capable of absorbing and releasing lithium ions is used, a configuration is preferred in which the anode is heated to have a temperature of 160° C. or more and less than 185° C. to be softened, in order to be able to easily reduce the overvoltage, and so on.

Further, in the above descriptions of the present invention, the solid battery 10 has been introduced which has a configuration where the lithium ions move between the anode 1 and the cathode 2 via the solid electrolyte layer 3. However, the present invention is not limited to this configuration. The solid battery to be applied with the method of the present invention, and the solid battery of the present invention (hereinafter these are collectively referred to as the "solid battery of the present invention".) may be configured such that an alkali metal ion other than the lithium ion (for example, sodium ion, potassium ion, etc.; the same shall apply hereinafter) moves between the anode and the cathode via the solid electrolyte layer. The solid battery of the present invention may have another configuration that an alkaline earth metal ion (for example, calcium ion, magnesium ion etc.; the same shall apply hereinafter.) moves between the anode and the cathode via the solid electrolyte layer. However, in order to be able to provide a solid battery having a high energy density, the configuration is preferred in which the lithium ions move between the anode and the cathode via the solid electrolyte layer.

In the case of the configuration in which an alkali metal ion other than the lithium ion moves between the anode and the cathode, an elemental alkali metal which forms the alkali metal ion may be used as an anode active material in the anode of the solid battery of the present invention. Other than this, the following examples may also be employed as the anode active material: a metal such as Zn, Al, and Ag; an alloy of an alkali metal which forms an alkali metal ion and another metal (for example Zn, Al, Ag etc.); and a carbon material such as graphite. Additionally, in the case of the configuration in which an alkaline earth metal ion moves between the anode and the cathode, an elemental alkaline earth metal which forms the alkaline earth metal ion may be used as an anode active material in the anode of the solid battery of the present invention. Other than this, the following examples may also be employed as the anode active material: a metal such as Zn, Al, and Ag; an alloy of an alkaline earth metal which forms an alkaline earth metal ion and another metal (for example Zn, Al, Ag etc.); and a carbon material such as graphite.

Furthermore, in a case of adopting the configuration in which an alkali metal ion other than the lithium ion moves between the anode and the cathode, a known cathode active material which generates the alkali metal ion may be adequately used in the cathode of the solid battery of the present invention. Additionally, in a case of adopting the configuration in which an alkaline earth metal ion moves between the anode and the cathode, a known cathode active material which generates the alkaline earth metal ion may be adequately used in the cathode of the solid battery of the present invention.

In the above descriptions of the present invention, the configuration in which the heating device 6 is embedded in the anode current collector 4 has been introduced as an example. However, the present invention is not limited to this configuration. In the present invention, it is sufficient as long as the heating device is provided in a manner capable of heating the anode.

Additionally in the above description of the present invention, the configuration of the cathode 2 and the solid electrolyte layer 3 being in a direct contact with each other has been introduced as an example. However, the present invention is not limited to this configuration. The solid battery of the present invention may have a configuration in which an electrolytic solution is filled between the cathode and the solid electrolyte layer in a state of being held in a separator as necessary. In the case of filling the electrolytic solution between the cathode and the solid electrolyte layer, a known electrolytic solution usable in a solid battery, such as an aqueous electrolytic solution and a non-aqueous electrolytic solution, may be adequately employed as this electrolytic solution. Specific examples of the aqueous electrolytic solution that can be employed include: an alkaline aqueous electrolytic solution in which a lithium salt is dissolved; and a neutral aqueous electrolytic solution in which a lithium salt is dissolved. In the present invention, a lithium salt such as $LiOH$, $CH_3COOLi$, $LiClO_4$, and $Li_2SO_4$ may be dissolved in the aqueous electrolytic solution; and the concentration of $LiOH$ may be more than 0 mol/L, and 5.12 mol/L or less. The concentration 5.12 mol/L is a saturated concentration at room temperature. However, when the concentration of the electrolyte is less than 0.1 mol/L, the lithium ion conductivity degrades significantly. Therefore, in order to help operation of the battery in this $LiOH$ concentration region, the following may be added: $KOH$, $NaOH$, $H_2O_2$ in a concentration of about 0.1 mol/L or more and 12 mol/L or less; or a combination of ($K^+$, $Na^+$, $H^+$, $NH4^+$, $Li^+$) and ($SO_4^{2-}$, $ClO_4^-$, $NO_3^-$, $Cl^-$, $Br^-$, $I^-$, $F^-$, $CH_3COO^-$, $PO_4^{3-}$); sea water, or the like. The solid battery of the present invention can be operated even in a state that a deposit of $LiOH$ is present in a concentration exceeding the saturated concentration 5.12 mol/L at room temperature. In addition, a specific example of the non-aqueous electrolytic solution may be a non-aqueous electrolytic solution containing a lithium salt and an organic solvent. Examples of the lithium salt to be contained in the non-aqueous electrolytic solution include: an inorganic lithium salt such as $LiPF_6$, $LiBF_4$, $LiClO_4$, and $LiAsF_6$; and an organic lithium salt such as $LiCF_3SO_3$, $LiN(CF_3SO_2)_2$, $LiN(C_2F_5SO_2)_2$, and $LiC(CF_3SO_2)_3$. Further, examples of the organic solvent to be used in the non-aqueous electrolytic solution include: ethylene carbonate (EC); propylene carbonate (PC); dimethyl carbonate (DMC); diethyl carbonate (DEC); ethyl methyl carbonate (EMC); butylene carbonate; γ-butyrolactone; sulfolane; acetonitrile; 1,2-dimethoxymethane; 1,3-dimethoxypropane; diethyl ether; tetrahydrofuran; 2-methyltetrahydrofuran; and a mixture thereof. Furthermore, in order to be able to use dissolved oxygen efficiently for reaction, it is preferable for the organic solvent to have high oxygen solubility. The concentration of the lithium salt in the non-aqueous electrolytic solution may be for example 0.2 mol/L or more and 3 mol/L or less. Furthermore in the present invention, a low-volatile liquid such as an ionic liquid may be used as the non-aqueous electrolytic solution. Moreover, in the case of holding the electrolytic solution in a separator, examples of the separator that can be employed include: porous membranes of polyethylene, polypropylene, etc.; and non-woven fabrics such as a resin non-woven fabric and a glass fiber non-woven fabric.

EXAMPLES

Figure 3:
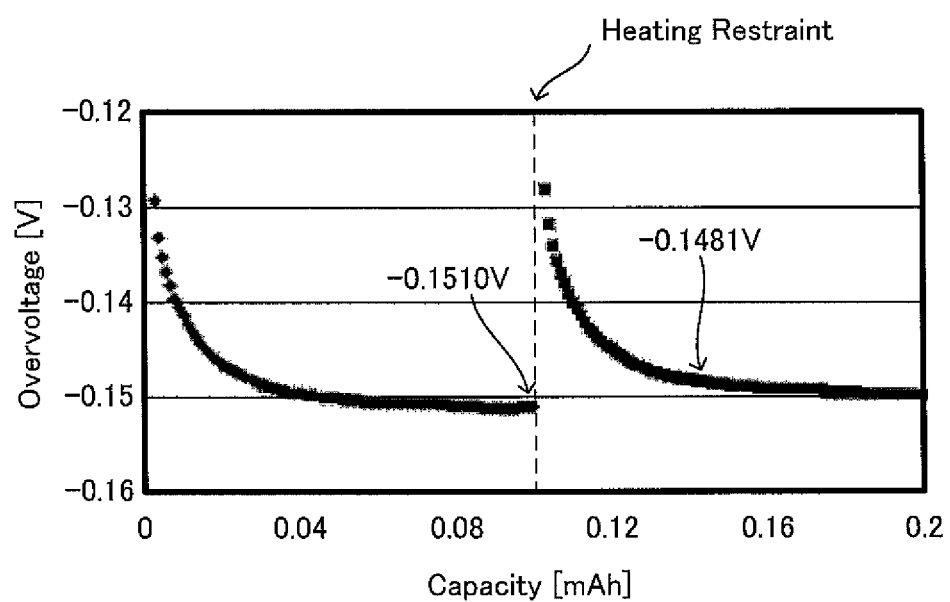
FIG. 3 shows a charging curve of a solid battery before and after application of the method for regenerating a solid battery of the present invention.

A solid battery 10 using a lithium foil as an anode 1 was charged for a certain period of time, and thereafter was regenerated by the method of the present invention. A heat generating device which generates heat by being applied with an electric current was used as a heating device 6. An anode 1a was heated to 160° C. by the heating device 6 to be softened. Then, a compressive pressure of 0.005 MPa was applied to the softening anode 1a for 30 seconds by using a fastening device 7, to thereby regenerate a solid battery 10a to a solid battery 10b. The charge curves of the solid battery 10a and the solid battery 10b are shown in FIG. 3. The vertical axis of FIG. 3 represents the overvoltage [V], and the horizontal axis of FIG. 3 represents the capacity [mAh].

As shown in FIG. 3, the overvoltage in the plateau region of the solid battery 10a before regenerated by the method of the present invention was −0.1510 V. However, the overvoltage in the plateau region of the solid battery 10b after regenerated by the method of the present invention was −0.1481 V. That is, the method of the present invention enabled reduction of the overvoltage of the solid battery 10 by 0.0029 V. Further, as shown in FIG. 3, in the solid battery 10a, the overvoltage exceeded −0.15 V before the capacity became 0.06 mAh. However, in the solid battery 10b regenerated by the method of the present invention, the overvoltage was less than −0.15 V even when the capacity exceeded 0.08 mAh. It can be seen that improvement in the close contact of the anode and the anode current collector by implementation of the method of present invention contributed to this result. From above, it was confirmed that the present invention enabled reduction of the overvoltage.

INDUSTRIAL APPLICABILITY

The solid battery of the present invention can be used for electric vehicles, hybrid vehicles and the like. In addition, the method for regenerating a solid battery of the present invention can be employed for the purpose of reducing the overvoltage of a solid battery for such applications to regenerate it.

The invention claimed is:

1. A method for regenerating a solid battery comprising an anode, a solid electrolyte layer, and a cathode, the method comprising:

heating the anode to a temperature at which the anode softens, and compressing the softened anode in a direction intersecting a face of the anode that is in contact with the solid electrolyte layer, wherein:

the anode is capable of absorbing and releasing an alkali metal ion or an alkaline earth metal ion that moves between the anode and the cathode;

the solid electrolyte layer contains a solid electrolyte having ion conductivity; and the cathode is capable of releasing and absorbing the alkali metal ion or the alkaline earth metal ion that moves between the anode and the cathode.

2. The method for regenerating a solid battery according to claim 1, wherein the anode is capable of absorbing and releasing a lithium ion and the anode is heated at a temperature of 160° C. or more and less than 185° C.

* * * * *